United States Patent Office 3,776,840
Patented Dec. 4, 1973

3,776,840
REGENERATION OF PLATINUM-GERMANIUM REFORMING CATALYST
Vincent J. Moravec, Jr., and William K. Meerbott, Houston, Tex., assignors to Shell Oil Company, Houston, Tex.
Filed Dec. 16, 1971, Ser. No. 208,731
The portion of the term of the patent subsequent to Apr. 4, 1989, has been disclaimed
Int. Cl. B01j 11/02, 11/80; C10g 35/06
U.S. Cl. 208—139
10 Claims

ABSTRACT OF THE DISCLOSURE

The activity and stability of a deactivated reforming catalyst containing a platinum group metal and germanium are restored to that of fresh catalyst by (1) removing substantially all carbon from the catalyst; (2) contacting the catalyst at about 900° F. with a non-reducing gas containing halogen, steam and oxygen until about 85% w. of the desired halide content is added; (3) discontinuing the use of stream and oxygen from the last-mentioned step until the halogenation is completed; and (4) drying and reducing the catalyst with a hydrogen-containing gas; then reusing the catalyst in a reforming process. Preferably, the catalyst is halogenated to a level about 20% greater than that of fresh catalyst. It is also preferred that the catalyst then be dried with a non-reducing gas at about 900° F. until the water content in the exit gas is below 150 p.p.m.v. followed by reducing at least the platinum oxides or chlorides by contact with a hydrogen-containing gas at 700–900° F. The regeneration procedure is especially applicable to platinum-germanium catalysts used in high severity fully-regenerative reforming processes.

BACKGROUND OF THE INVENTION

Field of the invention

This invention relates to a method for regenerating and halogenating a reforming catalyst comprising a platinum group metal plus at least one additional metal component on a refractory oxide support. More particularly, it relates to a process for regenerating and halogenating platinum-germanium (Pt-Ge) catalyst on an alumina support.

Description of the prior art

Catalytic reforming processes which employ regeneration may be either semi-regenerative or fully-regenerative. A semi-regenerative process is characterized by operation at relatively low severity, and low rate of catalyst deactivation, such that the process maintains a relatively high yield of reformate for a considerable length of time, i.e., for several month, before the process is stopped for catalyst regeneration. A fully-regenerative process is characterized by operation at relatively high severity, and a high rate of catalyst deactivation. The latter process contains a multi-reactor system where individual reactors can be removed for regeneration and a spare reactor can be substituted in its place without shutting down the process. Such systems are described in U.S. Pat. No. 2,773,014—Snuggs et al., and in U.S. Pat. No. 3,142,545—Raarup et al.

Catalysts containing as a hydrogenation component a platinum group metal and minor amounts of a second metal, such as rhenium or germanium, have proved particularly effective in petroleum refining processes for the hydroconversion of hydrocarbon feeds, especially semi-regenerative catalytic reforming processes. These catalysts are multi-functional and generally contain a hydrogenation component supported on a suitable refractory oxide support, usually alumina. Small amounts of halogen such as chlorine and/or fluorine are added to the composite to provide acid activity for acid catalyzed reactions such as dehydrocyclization and isomerization.

It is surprising that minor amounts of elements so different chemically and physically as rhenium (Group VII B; atomic wt.—186.3) and germanium (Group IV–A; atomic wt.—72.6) may be combined individually with platinum on alumina support to give distinctly improved reforming catalysts. Although the balance between various hydrocarbon reactions may differ with such catalysts, both have demonstrated exceptional activity and stability for catalytically reforming naphthas for the production of gasoline (see, e.g., U.S. Pat. 3,415,737—Kluksdahl, and U.S. Pat. 2,906,701—Stine et al.). Because of the exceptional stability of these catalysts, such processes can be operated at lower pressures and lower hydrogen/oil molar ratios thereby increasing the yield and improving the capability of existing processing units. However, catalyst activity gradually declines during processing due, among other things, to the build-up of carbonaceous deposits (coke) on the catalyst and/or depletion of halogen from the catalyst. Eventually it becomes necessary to regenerate the catalyst by subjecting it to an oxidizing atmosphere to burn off the coke (see, Kearby et al., U.S. Pat. 3,134,732 and U.S. 3,415,727). Halogen may be added to the catalyst as part of a regeneration procedure (Coe et al., U.S. 3,278,419). Frequently carbon burn-off and/or halogen replenishment fail to restore the activity and stability of the catalyst to its initial level or do so only temporarily and, during subsequent use of the catalyst, activity and selectivity decrease at an accelerated rate compared to fresh catalyst. This lower activity and stability, even of a regenerated and halogenated catalyst, is sometimes attributed to agglomeration or sintering of platinum metal crystallites.

It has been proposed to redisperse agglomerated platinum metal by exposing the substantially coke-free catalyst, after carbon burn-off, to a mixture of hydrogen chloride, steam and oxygen, which also provides chlorine (Engel, U.S. 2,981,694). Halogenation of the catalyst may also be accomplished during the carbon removal step. Apparently the combined action of halogen, steam, oxygen and hydrogen halide converts the platinum metal into a more finely dispersed platinum-halogen compound or complex. Afterward, it is necessary to reduce the complex before re-using the catalyst in the hydrocarbon conversion process. Reduction of the platinum-halogen-oxygen compound or complex to platinum metal can be effected by contacting the catalyst with a hydrogen-containing gas at high temperatures. In this manner a reforming catalyst containing only platinum as the hydrogenation component is restored to an activity and stability level equivalent to that of fresh catalyst. However, when a catalyst contains a platinum group metal and a modifier such as rhenium or germanium, the activity and stability levels are not restored to that of fresh catalyst by the above-mentioned regeneration-halogenation procedure. This difficulty could be caused by the formation of a platinum alloy or of mixed metal complexes, oxides or salts from which the active metal or metals are less easily dispersed than platinum alone.

In our patent, U.S. 3,654,142, issued Apr. 4, 1972, we have disclosed that the activity and stability of a platinum-rhenium-halogen catalyst supported on alumina can be restored to that of fresh catalyst by an improved regeneration-halogenation procedure. The halogenation procedure consists of contacting the catalyst at about 900° F. with a non-reducing gas containing halogen, steam and oxygen until about 85% wt. of the desired halide content is added, then discontinuing the use of steam and oxygen until the halogenation is completed. With the greater oxidation potential of oxidized germanium, a similar method applied to platinum-germanium-halogen on alumina catalysts might be expected to cause loss of germanium as volatile halide.

In a recently published Universal Oil Products Company South African patent application 70/7836 (based on U.S. application Ser. No. 880,411, field Nov. 26, 1969) the difficulty of regenerating a platinum-germanium-halogen catalyst was noted. Conventional carbon-burning techniques are said to result in catalysts having an extremely low activity and attempts at restoring the initial level of halogen by applying known procedures to the regenerated catalyst had been unsuccessful. These difficulties were overcome by conducting the carbon removal step in the presence of oxygen, steam and HCl, in two temperature steps and then reducing the catalyst in the presence of hydrogen, steam and HCl.

Heretofore, operation of platinum-germanium catalysts is fully-regenerative reforming processes under severe operating conditions to produce reformates having an octane number in excess of 100 F-1-0 has not been economical because the available regeneration procedures did not fully restore the activity and stability of the catalyst. By employing our regeneration technique surprisingly high yeilds of high octane reformate can now be obtained in a fully-regenerative reforming process.

SUMMARY OF THE INVENTION

A regeneration procedure has now been discovered which fully restores both the activity and stability of deactivated reforming catalysts containing as a hydrogenation component a platinum group metal plus a minor amount of germanium to a level equivalent to that of fresh catalyst. The process comprises contacting the deactivated catalyst with an oxygen-containing gas at high temperatures to effect substantially complete carbon removal, then contacting the catalyst with a non-reducing gas containing oxygen, steam and halogen at a temperature of from 800 to 1000° F. until about 85% wt. of the desired halide content has been added, discontinuing the use of water vapor and oxygen in the last-mentioned step until the desired halogen content is obtained, then drying and reducing the catalyst with a hydrogen-containing gas before reusing it in a reforming process. Preferably, the catalyst is halogenated to a level about 20% greater than that of fresh catalyst. It is also preferred that the catalyst then be dried with a non-reducing dry gas at a temperature of about 900° F. until the water content of the catalyst is below about 1.5% wt. before reducing the hydrogenation component with a hydrogen-containing gas. The regeneration procedure is especially applicable to platinum-germanium catalysts used in high severity fully-regenerative reforming processes. Presumably, when steam and oxygen are present in the halogenating gas stream, any germanium halides formed are immediately hydrolyzed to a stable oxide. Surprisingly, after 85% of the halogen has been added in the presence of steam and oxygen, the latter two components can be eliminated from the halogenating gas stream during the further addition of the halogenating agent in regenerating platinum-germanium-halide/alumina catalysts.

DESCRIPTION OF THE DRAWING

The advantages of the invention are illustrated in the accompanying drawing.

FIG. 1 and FIG. 2 compare a fresh platinum-germanium catalyst, with one regenerated according to this invention.

Figure 1:
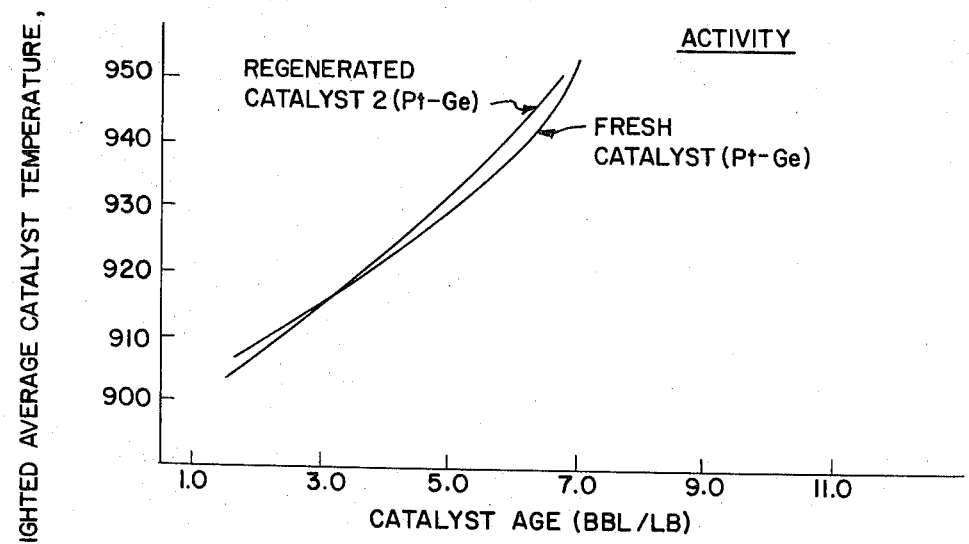
FIG. 1 is a plot of catalyst age versus bed temperature required to maintain a given conversion level, which illustrates activity at any given catalyst age and the rate of activity decline.

These figures and the operating conditions for the tests are detailed in the examples described herein.

DETAILED DESCRIPTION

The regeneration procedure of this invention is applicable to deactivated catalysts which contain a hydrogenation component comprising a platinum group component and a germanium component and a cracking component comprising a lower halogen combined on a porous support. Catalyst preparation methods are not critical and are well known in the art. A platinum component combined with a germanium component on a halogenated alumina support are particularly suitable. The metals of suitable reforming catalysts generally range from 0.2 to 0.9% wt. platinum group metal and 0.01 to 5% wt. of a second metal component. The halogen content ranges from 0.1 to about 1.5% wt. Within this range fluorine concentrations generally vary from 0.0 to 0.6% wt. while concentrations of 0.6 to 1.5% wt. are typical when the halogen is chlorine. In some cases the catalyst contains both chlorine and fluorine. Usually the hydrogenation metal components and halogen are supported on a suitable carrier such as gamma-alumina although other types of refractory metal oxides may be used. Such supports may also contain small amounts of promoters or stabilizers such as phosphorus, usually as aluminum phosphate, or silica.

After a period of operation in a reforming process the catalyst loses activity as indicated by decreasing yields of $C_5^+$ liquid product and increasing catalyst temperature requirement to maintain the desired conversion level. When continued operation becomes uneconomical the catalyst is usually regenerated in place by subjecting it to a free oxygen-containing oxidizing atmosphere at temperatures from about 725 to 950° F. to burn off carbon deposits or "coke." Platinum catalysts may also become deactivated during use due to platinum agglomeration. For redispersal of the platinum metal a conventional halogenation procedure is employed which comprises contacting a substantially carbon-free catalyst with a non-reducing gas containing oxygen at a partial pressure of 1.5 to 2.5 p.s.i.a., steam at a partial pressure of 1.0 to 5.0 p.s.i.a. and a lower halogen partial pressure of 0.05 to 0.25 p.s.i.a. at a temperature from 800 to 1000 F., and preferably at about 900° F. Such treatment results in a platinum-halogen complex or compound. It is not important what type of compound of the halogen is used; the halogen may be added as elemental gas, e.g., chlorine, a hydrogen halide or an organic halogen-containing compound such as trichloroethylene. This halogenation procedure is well known in the art (see, e.g., British Pat. No. 782,787).

When such a halogenation procedure is applied to catalysts containing platinum and germanium, the substantially carbon-free halogenated catalyst is somewhat less active than fresh catalyst initially and thereafter activity declines rapidly. Presumably, this behavior is due at least in part to the presence of the second metal component, either present as the oxide or possibly alloyed in part, with the platinum group metal and interfering with the platinum redispersal or otherwise modifying its function. Regardless of the form in which germanium is actually present in the catalyst it is referred to herein for convenience as the metal.

When free halogen is employed in the halogenation step, water vapor reacts with the halogen to form oxygen and a hydrohalide by the reverse Deacon reaction, e.g., $2Cl_2 + 2H_2O \rightarrow 4HCl + O_2$. Thus, oxygen is present during this step even though not added as such. Halogenation may also be accomplished by contacting the catalyst with a mixture of HCl and $O_2$ and the resulting $Cl_2$ and $H_2O$. When halogenating platinum catalysts not containing an additional metal component it is usual to add the desired quantity of halogen, purge the catalyst with an inert gas to remove oxygen and then reduce the platinum oxides with a hydrogen-containing gas at temperatures from 650 to 950° F. This latter step removes excess water from the catalyst support in addition to reducing the platinum from the oxide to the elemental form. Since the system is extremely wet at the end of the halogenation step, considerable halide can be removed from the catalyst while it is being purged with inert gas to remove oxygen.

It has now been discovered that by eliminating oxygen and steam from the non-reducing gas after about 85% weight of the desired halide content has been added, the activity and stability of platinum group catalysts containing germanium are restored to a level equal to or better than that of fresh catalyst. Where no oxygen is being added it is sufficient to stop adding steam; this eliminates the formation of oxygen. By continuing halogen addition at the same rate until the desired halogen level is reached after discontinuing water and oxygen, usually about 5 minutes, excess halogen is deposited at the front of the catalyst bed. The lower water content in the circulating non-reducing gas permits equilibration with the catalyst at a higher halogen content than would otherwise be achieved; chloride which would have been removed is retained in the catalyst bed. Regenerated catalysts having halide contents about 20% greater than that of fresh catalysts are particularly suitable in achieving improved stability in subsequent processing cycles. Possibly this is due at least in part to better dispersion of the platinum-germanium crystallites.

Any non-reducing gas or gas mixture may be used as a carrier during halogenation, for example, synthesis gas, nitrogen, air or mixtures thereof, so long as the gas does not contain known catalyst poisons such as carbon monoxide. Halogenation is suitably conducted at gas flow rates from about 50 to about 250 standard cubic feet per hour (s.c.f.h.) per pound of catalyst and preferably from 100 to 200 s.c.f.h. per pound at pressures from 50 to 500 p.s.i.a., and preferably from 100 to 250 p.s.i.a. Steam in the gas improves distribution of the halogen throughout the catalyst bed; water vapor and halogen compete for the active sites on the catalyst support. The halogen content of the catalyst can be varied by adjusting the steam/halogen molar ratio from as low as 2/1 to 200/1. Halogen is added to the non-reducing gas stream until the fresh catalyst halogen content has been restored. This step is conducted at temperatures from 800 to 1000° F. with a temperature of about 900° F. being particularly effective.

While drying may be effected simultaneously with the metal reducing step using a hydrogen-containing gas, a preferred method is to dry the catalyst by contact with a non-reducing gas, generally the same carrier gas used during hydrogenation without the water. Reduction of platinum under wet conditions results in sintering of the platinum-metal crystallites and lower activity. Although drying may be done in once-through operation, it is more convenient to circulate the drying gas. Water from the catalyst is removed by reducing the temperature of the circulating gas in a high pressure vessel of the system, separating the water from the gas and reheating the gas before again contacting the catalyst. Suitable pressures are about 30 to 400 p.s.i.a. Lower pressures are preferred for more complete water removal at a given temperature. The catalyst is preferably dried until the water content of the catalyst is about 1.5% wt., which is indicated when the water content of the non-reductive drying gas is less than 150 p.p.m.v. on leaving the catalyst when gas flow rates of 100 to 200 s.c.f.h. per pound of catalyst and temperatures of 850 to 1000° F. are used.

Reduction of the hydrogenation component is generally accomplished with a hydrogen-containing gas at temperatures not higher than about 950° F. At temperatures above this the metallic halogen compound or complex disintegrates and sintering of the metal to catalytically inactive metallic crystallites occurs. Generally, reduction is effected at a temperature in the range of from 600 to 900° F., although temperatures from 700–800° F. are preferred. Gas flow rates of 100 to 200 s.c.f.h. per pound of catalyst are suitable. Pressures from 50 to 400 p.s.i.a. are suitable.

Heretofore platinum-germanium on alumina reforming catalysts have been ineffective in high severity reforming processes because no adequate regeneration procedure was available. By combining the regeneration procedure of this invention with high severity fully-regenerative reforming operations which use platinum-germanium catalyst, exceptionally high yields of debutanized reformate having an octane number greater than about 101 F–1–0 can now be obtained from naphtha boiling range hydrocarbons having an octane number less than about 75 F–1–0. The combination is particularly effective for producing reformates having octane numbers of about 104 F–1–0.

The following examples illustrate the invention but are not considered limiting.

EXAMPLE I

To demonstrate the effectiveness of the halogenation procedure of the invention on platinum-germanium catalysts which have been deactivated in a reforming process and subjected to carbon removal, a fresh commercial catalyst containing 0.375% wt. platinum, 0.25% wt. germanium and 1.05% wt. chlorine on alumina (Catalyst 1) was evaluated as a basis for comparison. This evaluation was carried out in a two-reactor, quasi-isothermal, semi-regenerative pilot plant. Operating conditions were 250 and 200 p.s.i.g., respectively, 7.0–8.0 hydrogen/oil molar ratio, 2.0 LHSV and temperatures as required to produce 100 F–1–0– debutanized octane number reformate.

The feedstock was a hydrotreated west Texas heavy straight run naphtha with addition of 0.9 p.p.m.w. chloride (as chlorobenzene). Feedstock properties are given in Table 1.

TABLE 1

| | |
|---|---|
| Density at 60° F. | 0.7706 |
| Composition, percent v.: | |
| Paraffins | 44.4 |
| Naphthenes | 38.3 |
| Aromatics | 17.3 |
| ASTM distillation, ° F.: | |
| IBP | 230 |
| 10% | 258 |
| 20% | 266 |
| 50% | 286 |
| 70% | 304 |
| 90% | 330 |
| EP | 368 |
| Octane number, F–1–0 | 45 |

Figure 2:
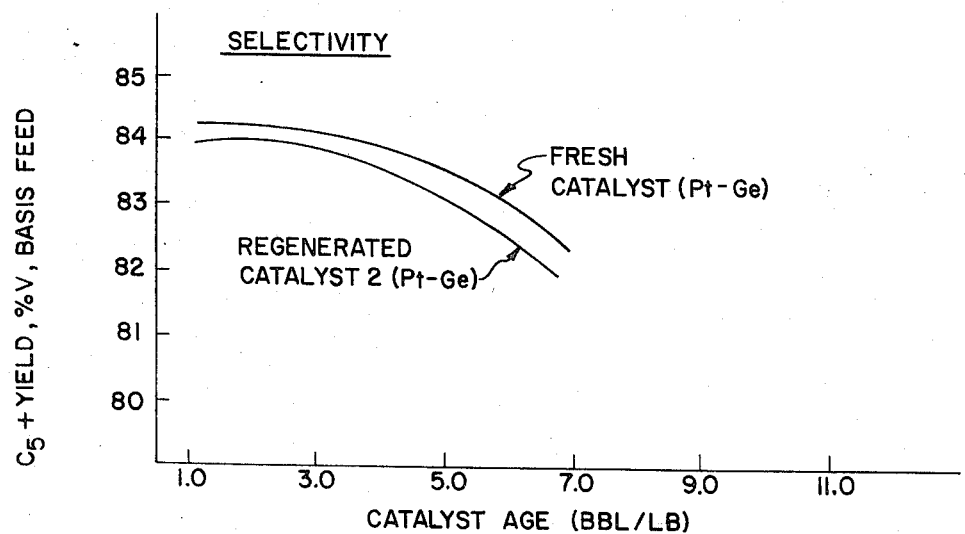
FIG. 2 is a plot of catalyst age versus yield of useful products, which illustrates catalyst activity in different terms, i.e., selectivity.

Long-term activity (bed temperature) and selectivity ($C_5^+$ yield) of the fresh catalyst under these operating conditions are shown in FIGS. 1 and 2 of the drawing as a function of catalyst age. Activities and selectivities were corrected to a 100 F–1–0 octane number. This germanium-promoted platinum catalyst was more active and stable than reforming catalysts containing only platinum as a hydrogenation component, the activity advantage reaching 35–40° F. weighted average bed temperature at 4.5 bbl./lb. (barrels/pound) catalyst age for similar feedstocks. Up to about 1.5 bbl./lb. catalyst age the platinum-germanium catalyst had about the same selectivity (basis feed) as a platinum-only catalyst. However, from about 2.5 bbl./lb. the platinum-germanium catalyst was at least 1.0% v. (basis feed) more selective than a platinum-only catalyst.

After the fresh catalyst had become deactivated in the preceding run, it was subjected to a conventional carbon burn-off. After evacuating and purging the reactor with nitrogen, 0.5% oxyen was added to the nitrogen stream which was passed over the catalyst at a rate of about 190 s.c.f.h./lb. The temperature was gradually increased from about 725° F. to 950° F. Substantially all the remaining carbon was then removed by increasing the oxygen content of the nitrogen to 1.5% v. and maintaining the temperature at 950° F. for about five hours.

After the carbon removal step the oxygen content of the nitrogen was increased to 2.0% v. and the platinum-germanium metals and/or alloy were redispersed by adding 2.2% v. water vapor and 0.2% v. chlorine to the nitrogen until the catalyst chloride level was increased to about 1.0%. Normally this step requires about 45 minutes at which time oxygen, steam and chlorine are discontinued simultaneously. However, instead of discontinuing oxygen, steam and chlorine simultaneously from the nitrogen stream at the end of the halogenation step, steam and oxygen were discontinued after 40 minutes and chlorine was injected at the same rate for an additional five minutes. Gas hourly space velocities varied from 100 to 200 s.c.f.h./lb. at 100 p.s.i.g. The catalyst (Catalyst 2) was then dried at 100 p.s.i.g. and 900° F. with 100 s.c.f.h./lb. dry nitrogen until the water concentration in the exit gas was below 25 p.p.m.v., and reduced with dry hydrogen (100 s.c.f.h./lb.) for one hour at 100 p.s.i.g. and 700° F.

Catalyst 2 was then tested under the same operating conditions employed for fresh Catalyst 1. As shown in FIGS. 1 and 2, Catalyst 2 was slightly less active and had a slightly lower selectivity than fresh catalyst although these results are within the limit of experimental error. However, Catalyst 2 was considerably more active and selective than fresh platinum-only catalyst tested under these same conditions.

EXAMPLE II

This example demonstrates that platinum-germanium reforming catalyst is not as good as a platinum-only reforming catalyst when employed in a fully-regenerative reforming process to produce reformates with octane numbers below 100 F–1–0.

Catalyst 1 (Example I) was evaluated using a fully-regenerative reforming pilot plant consisting of 4 reactors each capable of being removed from the process for regeneration by the method of the invention outlined in Example I and replaced by another reactor while the process operation continues. Reactors are removed for regeneration according to a sequence calculated to maintain catalyst activity and selectivity at a maximum. The same regeneration sequence was used for all fully-regenerative tests. This evaluation was made at 2 sets of conditions: (1) 225 p.s.i.g., 2.0 LHSV, 3–4 $H_2$/oil and (2) 150 p.s.i.g., 1.5 LHSV, and 3 $H_2$/oil. For comparison with a platinum-only catalyst containing 0.37% wt. platinum and 0.76% wt. chloride on alumina (Catalyst 3), a computer simulation was made using the same operating conditions, the same feedstock and a catalyst activity equal to that of fresh catalyst. The feedstock was the same heavy straight run naphtha used in Example I.

Figure 3:
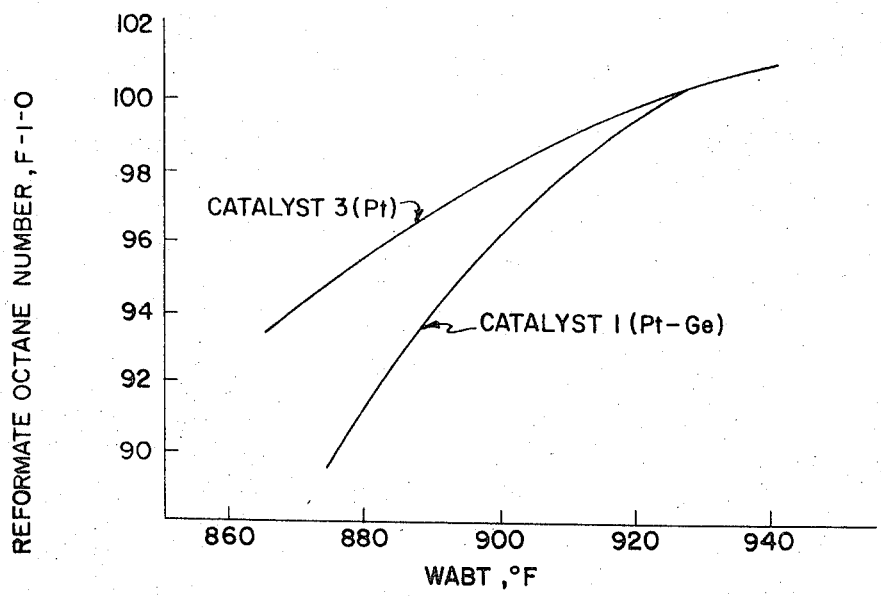
FIGS. 3, 5 and 7 are plots of weighted average bed temperature (WABT) required to achieve a given octane number in a fully-regenerative reforming process under specified conditions versus reformate octane number. A more active catalyst will give a higher octane number at a given bed temperature. A platinum-germanium catalyst is compared with a platinum-only catalyst in all three figures.
Figure 4:
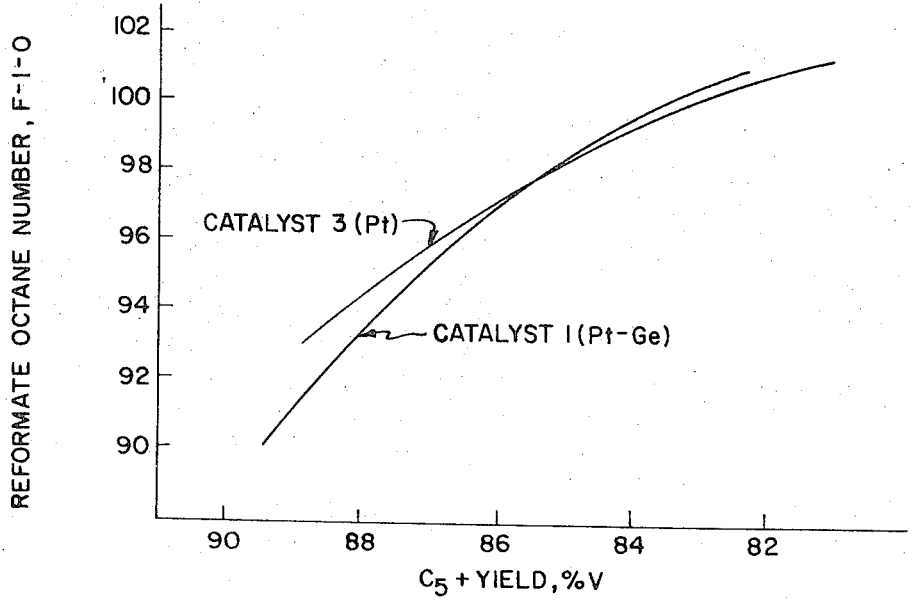
FIGS. 4, 6, and 8 are plots of yield versus reformate octane number obtained in a fully-regenerative reforming process under specified conditions. A more active catalyst will give a higher yield of reformate at a given octane number, or conversely, a higher octane number at a given yield. A Pt-Ge catalyst is compared with a Pt-only catalyst in all three figures.

The activity and selectivity obtained with Catalysts 1 and 3 while reforming under the first set of conditions mentioned above are shown in FIGS. 3 and 4. These data were taken on a catalyst age of from 1–11 bbl./lb. The operation was stable during third period with no indication of a decline in either activity or selectivity. These figures show that at low severity operating conditions and octane numbers below 100 F–1–0 platinum-germanium Catalyst 1 is not as effective as the platinum-only Catalyst 3 for fully regenerative operation.

Figure 5:
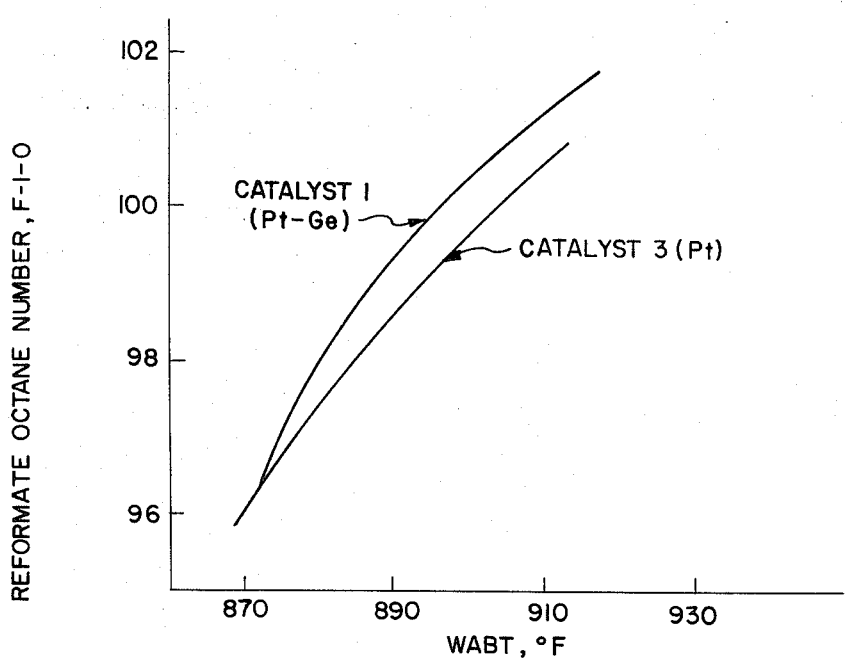
Figure 6:
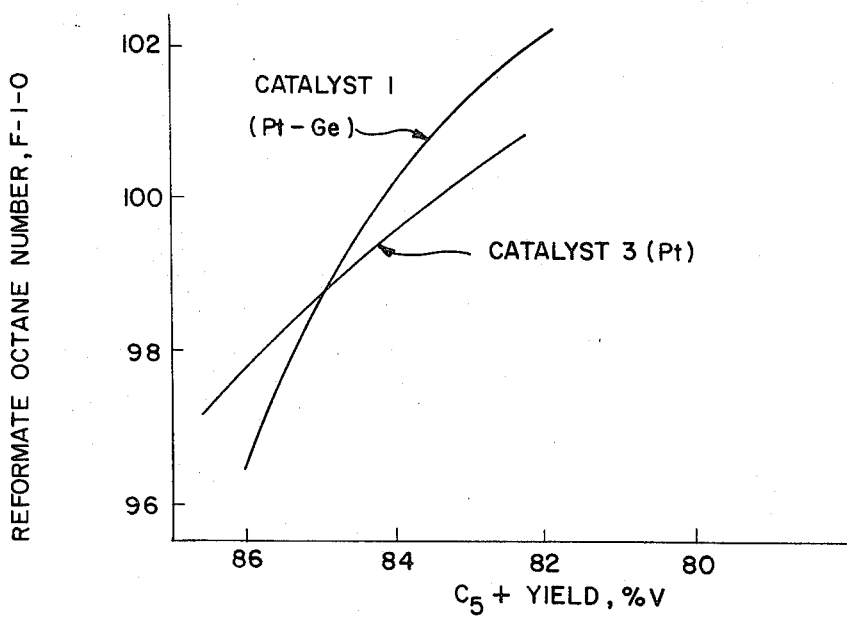

At a catalyst age of 12.6 bbl./lb. operating conditions were changed to the high severity second set mentioned above. The activity and selectivity of Catalysts 1 and 3 obtained under these conditions are shown in FIGS. 5 and 6. The Catalyst 3 comparison was obtained in actual operation rather than by computer simulation. At low reformate octane numbers, Catalyst 1 shows no advantage over Catalyst 3 and even indicates a slight disadvantage. However, at temperatures above those required to give a debutanized reformate octane number of about 100 F–1–0 Catalyst 1 shows a yield and activity advantage which appears to increase with increasing severity. By utilizing the improved halogenation procedure of the invention, stable operation was obtained over a catalyst age in excess of 5 bbl./lb.

EXAMPLE III

To demonstrate the potential of the halogenation procedure of the invention as described in Example I on a bimetallic catalyst which has been deactivated in a very high severity fully-regenerative reforming process, the performance of fresh platinum-germanium Catalyst 1 (Example I) was compared to platinum-only Catalyst 3 (Example II) under operating conditions to produce a reformate having an F–1–0 octane number between about 101 and 104. Conditions for this experiment were 150 p.s.i.g., 3 hydrogen/oil molar ratio, 1.0 LHSV and temperatures as required to produce a given octane number reformate. A four-reactor fully-regenerative pilot plant was used for Catalyst 1 and the feedstock was the same as that used in Example I. Comparative data for Catalyst 3 were obtained by computer simulation using the same feed and operating conditions and a catalyst activity equal to that of fresh catalyst as in Example II.

Figure 7:
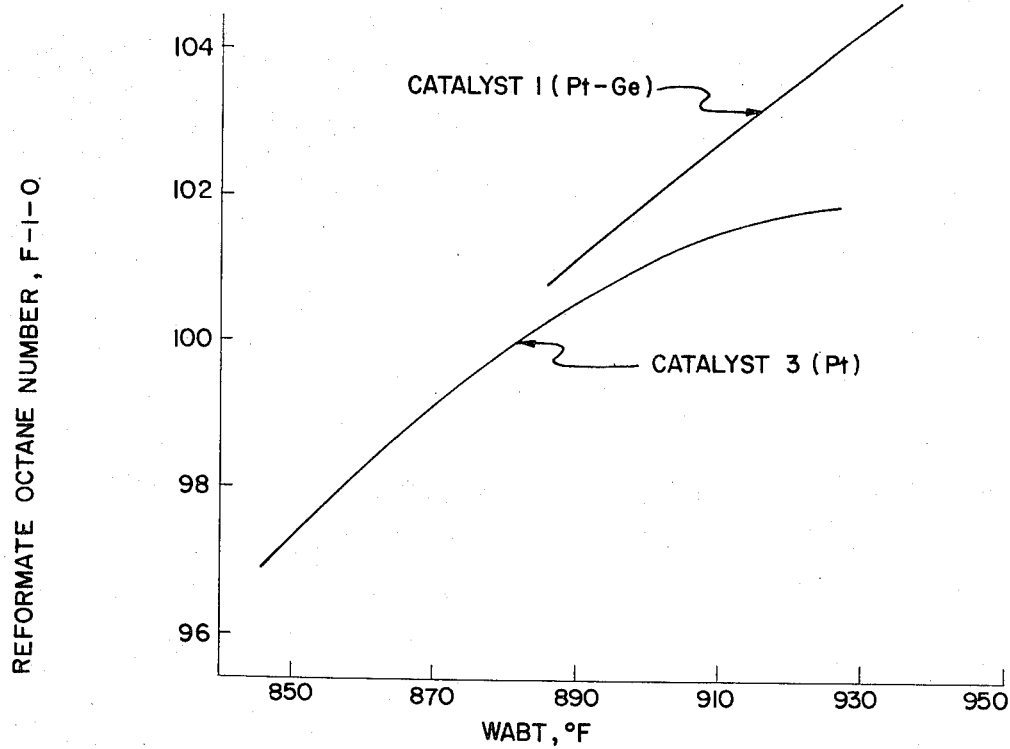
Figure 8:
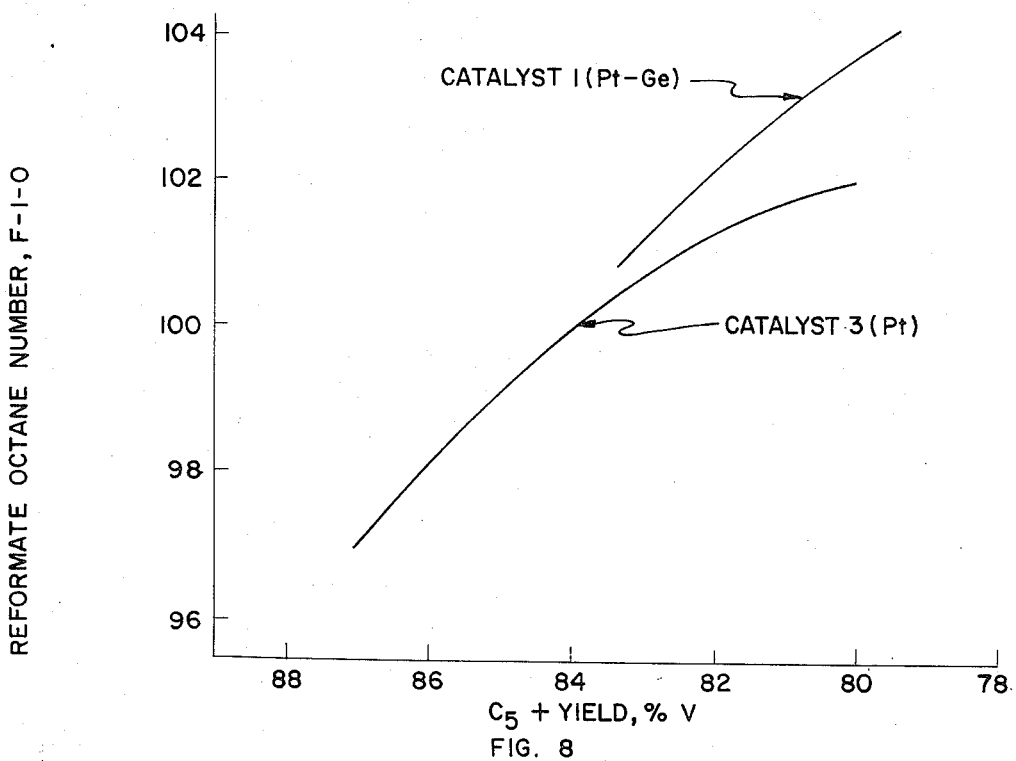

FIG. 7 shows that above 101 F–1–0 unit increase in F–1–0 octane number is realized at a given weighted average bed temperature. FIG. 8 shows that the yield-octane curve for Catalyst 1 rises smoothly with increasing severity and indicates an 81% v. $C_5^+$ yield at 103 octane number and a 79.5% v. yield at 104 octane number. These octanes are unobtainable at reasonable yields with platinum-only Catalyst 3.

When the $C_5^+$ yields and average bed temperature for Catalyst 1 were corrected to the average octane number attained during the course of the entire run (103 F–1–0) and plotted versus catalyst age, it appeared that operation was stable at the 103 F–1–0 octane number reformate level, i.e., no loss of activity was indicated.

It is considered significant that neither the temperature-octane number nor the yield-octane number curves shows a tendency to level off at the highest severity reached during the run. This suggests that still higher octane numbers are attainable at reasonable yields with Catalyst 1.

What is claimed is:

1. In a process for reforming naphtha boiling range hydrocarbons by contact in the presence of hydrogen with a catalyst comprising a platinum group component, germanium and halogen on a refractory oxide support under reforming conditions, said catalyst having been deactivated in the process and regenerated by contact with an oxygen-containing gas at temperatures to effect substantially complete carbon removal; contacted with a non-reducing gas containing oxygen at a partial pressure of 1.5 to 2.5 p.s.i.a., steam at a partial pressure of 1.0 to 5.0 p.s.i.a. and lower halogen at a partial pressure of 0.05 to 0.25 p.s.i.a. at a temperature of from 800 to 1000° F. to effect halogenation; contacted with a hydrogen-containing gas at temperatures from 600 to 1000° F. to dry the catalyst and reduce the platinum to elemental form;

the improvement which comprises discontinuing steam and oxygen from the halogenation gas when about 85% wt. of the desired halide content has been added and continuing to contact the catalyst with the lower halogen until the desired halogen content is obtained.

2. The process of claim 1 wherein substantially complete carbon removal from the deactivated catalyst is effected by contact with a non-reducing gas containing oxygen at a partial pressure of 0.1 to 2.5 p.s.i.a. at temperatures between 725 and 950° F.

3. The process of claim 1 wherein after contact with halogen the catalyst is first dried by contact with a non-reducing gas at a temperature of about 900° F. until the water content of the catalyst is below about 1.5% wt. and then further dried and reduced by contact with a hydrogen-containing gas at a temperature between 700 and 800° F.

4. The process of claim 1 wherein the catalyst comprises from 0.2 to 0.9% wt. platinum, from 0.1 to 5% wt. germanium and from 0.6 to 1.5% of chlorine on an alumina support, and the lower halogen is chlorine.

5. The process of claim 4 wherein the non-reducing gas flow rate is from 50 to 250 s.c.f.h. per pound of catalyst and the total system pressure is from 50 to 500 p.s.i.a.

6. The process of claim 5 wherein sufficient chlorine is added to provide a catalyst halide content about 20% greater than that of fresh catalyst.

7. In a fully-regenerative fixed-bed reforming process having catalyst in a plurality of reaction zones, each of which can be removed from the process for regeneration of deactivated catalyst and a spare reaction zone substituted in its place without shutting down the process, wherein naphtha boiling range hydrocarbons having an octane number less than about 75 F–1–0 are reformed to produce a debutanized reformate having an octane number greater than about 101 F–1–0 by contacting said hydrocarbons in the presence of hydrogen with a catalyst comprising from 0.2 to 0.9% wt. platinum, from 0.01 to 5% wt. germanium and from about 0.6 to 1.5% wt. chlorine on an alumina support under severe reforming conditions, wherein the deactivated catalyst is regenerated by carbon removal, halogenation, drying and reduction steps, the improvement which comprises discontinuing steam and oxygen from the halogenation gas when about 85% wt. of the desired halide content has been added and continuing to contact the catalyst with the lower halogen until the desired halogen content is obtained.

8. The process of claim 7 wherein the lower halogen is chlorine and after said halogen contact the catalyst is first dried with a non-reducing gas at a temperature of about 900° F. until the water content of the catalyst is below about 1.5% wt. and then further dried and reduced by contact with a hydrogen-containing gas at a temperature between 700 and 800° F.

9. The process of claim 8 wherein the non-reducing gas flow rate is from 50 to 250 s.c.f.h. per pound of catalyst and the total system pressure is from 50 to 500 p.s.i.a.

10. The process of claim 8 wherein during regeneration sufficient chlorine is added to provide a catalyst halide content about 20% greater than that of fresh catalyst.

References Cited
UNITED STATES PATENTS

| | | | |
|---|---|---|---|
| 3,622,520 | 11/1971 | Hayes | 252—415 |
| 3,654,142 | 4/1972 | Moravec, Sr., et al. | 208—140 |
| 3,654,182 | 4/1972 | Hayes | 252—415 |

DELBERT E. GANTZ, Primary Examiner

S. L. BERGER, Assistant Examiner

U.S. Cl. X.R.

208—140; 252—415